United States Patent [19]
Lasher

[11] 3,896,098
[45] July 22, 1975

[54] UNSATURATED POLYESTER RESIN, COATINGS MADE THEREFROM AND METHOD OF MAKING SAME

[75] Inventor: Edward A. Lasher, Beverly Hills, Calif.

[73] Assignee: Whittaker Corporation, Los Angeles, Calif.

[22] Filed: June 13, 1973

[21] Appl. No.: 369,431

[52] U.S. Cl............... 260/872; 260/75 UA; 260/77; 260/485 G; 260/861
[51] Int. Cl.$^2$...C08F 236/20; C08F 267/06; C08L 67/06
[58] Field of Search......260/861, 872, 75 UA, 77, 260/485 G

[56] References Cited
UNITED STATES PATENTS

| | | | |
|---|---|---|---|
| 2,680,722 | 6/1954 | Anderson | 260/17.3 |
| 2,852,487 | 9/1958 | Maker | 260/45.4 |
| 2,889,312 | 6/1959 | Szayna | 260/77 |

Primary Examiner—Melvin Goldstein
Assistant Examiner—E. A. Nielsen
Attorney, Agent, or Firm—Jay H. Quartz; Donald E. Nist

[57] ABSTRACT

A hydroxy-terminating tetraester is first made by reacting three mols of a diol with two mols of an unsaturated dicarboxylic acid. This tetraester, in turn, is reacted with a monoester of an unsaturated monohydric alcohol and an unsaturated dicarboxylic acid to produce a highly-unsaturated polyester resin of relatively low molecular weight. When the latter resin is cured, and particularly when it is cured in combination with the product resulting from the esterification of an aliphatic, saturated dibasic acid with the diallyl ether of an aliphatic triol having primary hydroxy groups, a hard, strongly-adhering coating is produced for use in coating untreated, unprimed metal.

24 Claims, No Drawings

UNSATURATED POLYESTER RESIN, COATINGS MADE THEREFROM AND METHOD OF MAKING SAME

BACKGROUND OF THE INVENTION

This invention relates to polyester resins and, more particularly, to highly unsaturated polyester resins of low molecular weight which, when cured, form highly crosslinked coatings for metal.

Metals which are to be coated are usually chemically treated to enhance the bonding characteristics of the metal's surface. This may be done by, for example, immersing the metal in a phosphoric or chromic acid bath to thereby passivate the metal by leaving phosphate or chromate salts adhering to the metal. In addition to being subjected to chemical treating, metal is also usually primed, i.e., is coated with a primer which further improves the adherence of a coating to the metal. The disadvantage of using these processes is that they are both costly and time-consuming. Additionally, the chemical treatment can contribute significantly to water pollution since large amounts of the chemicals used in the chemical treatment process are often dumped into the nearest body of water. If this is not permitted, the cost to clean the used chemical treatment solutions substantially increases the cost of the chemical treatment.

SUMMARY OF THE INVENTION

The method of this invention includes a first step of reacting a diol with an unsaturated dicarboxylic acid in a molar ratio of about 3:2 to produce a hydroxy-terminated tetraester. The latter is then reacted with a monoester of an unsaturated monohydric alcohol and an unsaturated dicarboxylic acid or anhydride in a ratio of about 1.2 moles of the latter per mol of the hydroxy terminated tetraester to produce a highly-unsaturated polyester resin of relatively low molecular weight. Usually, the latter is applied as is, or in combination with an aliphatic dicarboxylic acid ester of the diallyl ether of an aliphatic triol, preferably having primary hydroxyls to a substrate in emulsion form and cured with a peroxide to cross-link the resin to form a hard, strongly-adhering coating.

This method has several advantages. Perhaps the most important is the fact that the unsaturated polyester can be applied directly to a cleaned, untreated, unprimed surface. Besides lowering the cost of coating the substrate, the elimination of metal treatment chemicals can materially improve the environment. Additionally, the cured films produced by this method are hard and highly water-resistant. Furthermore, these films can be made impact resistant so that they can be used for coil coatings.

DESCRIPTION OF THE PREFERRED EMBODIMENT

In brief, a diol is reacted with a dicarboxylic acid or anhydride in a specific molar ratio to produce a tetraester having terminal hydroxy groups. The resulting tetraester is then reacted with a monoester of an unsaturated monohydroxy alcohol and an unsaturated dicarboxylic acid to produce a highly unsaturated polyester, i.e., a polyester having a high degree of unsaturation per molecular weight. The latter is thereafter preferably mixed with a highly unsaturated ester monomer in a desired carrier vehicle, coated onto a substrate and cured in situ to produce a highly, densely cross-linked coating.

More specifically, the diol is preferably an aliphatic, straight chain diol or cyclic aliphatic diol. Such diols aid in producing cured films which have the desired flexibility and impact resistance. Among the aliphatic diols, it is preferred to use higher molecular weight diols such as a hexane diol as compared with ethylene diol (glycol) since the longer carbon skeleton of the former further enhances the flexibility and impact resistance of the highly cross-linked cured films. However, for applications where the flexibility and impact resistance of the cured film is not of primary importance, e.g., on flat surfaces which are not subject to impact, aromatic diols may also be employed as the diol constituent.

Examples of useful diols include: 1,6-hexane diol; polypropylene glycol (having, for example, a molecular weight of 425); tetraethylene glycol; neopentyl glycol; triethylene glycol, dipropylene glycol; 2,2,4-trimethyl pentane - 1,3 diol; 1,4-dimethanol cyclohexane; diethylene glycol; ethylene glycol; 1,2 and 1,3 propylene glycol; 1,3 and 1,4 butylene glycol; 1,5 pentane diol; 2-ethyl, 2-methyl, 1,3 propane diol; 1,10 decane diol; and di(hydroxymethyl) benzene.

One or more of the diols as well as one or more members of the other components herein may be employed in any given formulation.

The unsaturated dicarboxylic acid is preferably employed in the anhydride form when the tetraester is produced by the two-step method described hereinafter. The reason for this preference is that the rate of reaction between the anhydride and the diol is much faster than that between the acid and diol. This results in a "cleaner" reaction when the anhydride is used since only the diester is formed because of the much lower temperature required for the anhydride to react with the diol; whereas the free carboxylic acid requires a much higher temperature for appreciable reaction to take place.

As used herein and in the claims, the term "dicarboxylic acid" includes both the acid itself and its anhydride equivalent. The unsaturated dicarboxylic acid used herein is, and the term "unsaturated dicarboxylic acid" is used herein to mean, an unsaturated, aliphatic dicarboxylic acid or a mono-unsaturated aliphatic substituted, saturated dibasic acid. Useful dicarboxylic acids include: maleic acid; tetrahydrophthalic acid; octenyl and nonenyl succinic acids; and fumaric acid.

The third component is a monoester of an unsaturated, monohydric alcohol and an unsaturated dicarboxylic acid and has a high degree of unsaturation per unit molecular weight. The unsaturated locations in this component and in the dicarboxylic acid aid in providing the highly cross-linked structure of the cured films. Examples of this component include: monoallyl maleate; monovinyl maleate; mono methallyl maleate; monoallyl fumarate; mono methallyl fumarate; mono methallyl itaconate; monoallyl itaconate; mono allyl tetrahydrophthalate; and mono methallyl tetrahydrophthalate.

A catalyst is preferably employed as described hereinafter to increase the rate of reaction and to thereby permit the use of lower reaction temperatures. Useful catalysts include phosphoric acid and dibutyl tin oxide, as well as other catalysts which are known and used for increasing esterification reaction rates. Catalytic amounts of the catalyst may be employed to increase the reaction rate. However, with respect to the use of phosphoric acid, it has been found that this catalyst may be employed in amounts up to about 2%.

The reaction mixture also preferably includes an inhibitor to prevent gelation when the monoester of an unsaturated monohydric alcohol and an unsaturated dicarboxylic acid is added to the reaction mixture. These inhibitors are wellknown and, like the catalyst, do not constitute a part of this invention except as they are preferably employed herein. A useful inhibitor is hydroquinone.

The synthesis of the unsaturated polyesters will now be described. If only a single diol is to be employed, the diol may be reacted with the dicarboxylic acid by including all of both constituents in the initial reaction mixture. On the other hand, if two different diols are to be used, one of those diols is preferably reacted with all of the dicarboxylic acid and thereafter, the other diol is added to the resulting reaction mixture to further react with the dicarboxylic acid. It is to be understood, however, that where more than one diol is used, the diols may be added altogether or in various quantity ratios of two different times to place the diols more randomly in the polyester.

Regardless of whether the diol fraction is added all at once or in two batches, the molar ratio of the diol to dicarboxylic acid will always be such as to place a diol unit between a pair of dicarboxylic acid units, as well as to place those dicarboxylic acid units between a pair of diol units so that the tetraester formed by the esterification of the dicarboxylic acid with the diol has the following skeletal structure:

HO — D — Db — D — Db — D — OH where D and Db represent the diol and dicarboxylic acid components, respectively, and where D and Db are connected through ester groups. As shown by the foregoing structure, the tetraester is terminated at each end by hydroxy groups.

In order to obtain the foregoing structure, about three moles of diol are reacted with each two moles of dicarboxylic acid when all of the diol is added to the dibasic acid in the initial step. On the other hand, if the diol is added in two stages, the molar ratio of the diol to the dicarboxylic acid in the first stage is about 1:2 to produce a diester having the following skeletal structure:

HOOC — Db — D — Db — COOH where D and Db are as represented hereinbefore and where D and Db are connected through ester linkages. In the second stage of this alternative procedure, an additional two moles of diol (to provide the required overall 3:2 molar ratio of diol to dicarboxylic acid) are added to the foregoing diester to produce the above-identified tetraester.

If the aforementioned 3:2 molar ratio is not substantially adhered to, the excess dicarboxylic acid or diol will remain essentially unreacted, and this can result in cured films having unacceptable characteristics due to the presence of such small units in the coating composition. Although a small loss (up to about 8%) of end hydroxyl groups may occur, the coatings are not adversely affected because of the excess of end hydroxyl groups in relation to the number of acid groups introduced with the monoester. In fact, there are sufficient excess end hydroxyl groups on the tetraester that, theoretically, only about 60% of the hydroxyls at each end location are esterified since only about 1.2 moles of the monoester are used per mole of tetraester. However, the presence of so many unreacted hydroxyl groups does not adversely affect the cured coatings because of the highly dense cross-linked structure of the cured coatings.

More specifically, in the procedure where all of the diol is initially combined with all of the dicarboxylic acid, these two components are added to a reaction chamber together with a sufficient amount of reflux solvent such as toluene. The reaction chamber is fitted with a stirrer and means for providing an inert atmosphere in the chamber. Although the vapors produced from the reactants may be sufficient to provide the desired inert atmosphere over the reactants, it is preferable to introduce an inert gas, that is, a gas inert to the reactants, such as nitrogen or carbon dioxide into the chamber during the reaction to maintain a positive pressure over the reactants. After the diol, dicarboxylic acid and reflux solvent have been charged to the reactor and the desired inert atmosphere has been provided, heating of the reactants is commenced. Heating is continued until an exotherm starts, at which time the heating is discontinued. When the temperature of these reactants has peaked, the heat is again turned on. The catalyst may be added at this time or it may have been included in the reaction mixture from the beginning. The temperature is raised to about 400° F over a period of about seven hours to preferably obtain an acid number of about five, at which time the heat is turned off and the temperature is allowed to drop. At a suitably lower temperature, the monoester is added together with all or a portion of the inhibitor. The temperature is again raised to about 400°F maximum over a period of about eight hours to obtain an acid number below about 28, at which time heating is discontinued and the reflux solvent is removed.

The foregoing reaction times and temperatures are illustrative only and may be modified as is well known in the art. Additionally, the final acid number range of below about 28 can be modified to some extent depending upon the cure temperatures employed in obtaining a cured film. Above an acid number of about 28, there will be increasingly larger amounts of more volatile material present in the film composition because of the presence of larger amounts of unreacted, lower molecular weight material. During cure at the usual cure temperatures of about 400° – 600°F, the latter material will be lost from the film in significant amounts with adverse effects on the cured film. However, if lower cure temperatures are employed, acid numbers somewhat higher than 28 can be tolerated since the more volatile components will largely be retained by the film. Below an acid number of about 28, the expected weakness resulting from copolymerization of unreacted monoester and dihydroxy tetraester is not realized because of the extensive cross-linking which exists in the cured film.

When the diol is added in two steps, the procedure is similar to the foregoing except that the initial charge comprises the diol and acid anhydride in a 1:2 molar ratio, respectively. After the exotherm peak has been passed, the remainder of the diol is added to provide the requisite 3:2 molar ratio of diol to dicarboxylic acid. At the same time that the second amount of diol is charged, the catalyst is preferably also charged to the reactor.

The resulting polyester may be cured as a film or, preferably, it is cured together with another highly unsaturated ester monomer. The latter is produced by esterifying a saturated aliphatic dicarboxylic acid with the diallyl ether of an aliphatic triol having three primary hydroxy groups. The aliphatic dicarboxylic acid is a saturated dicarboxylic acid having from 4 to 10 carbons. Examples of the aliphatic dicarboxylic acid include adipic acid, succinic acid, azelaic acid, trimethly adipic acid, glutaric acid, suberic acid, and sebacic acid.

The aforementioned diallyl ether of an aliphatic triol is an ether in which the triol portion has three primary hydroxy groups. Again, the term "diallyl" includes dimethylallyl. Useful examples include the diallyl and dimethallyl ethers of trimethylol propane, trimethylol butane, and trimethylol ethane.

This diester monomer is made by reacting 1 mole of the dicarboxylic acid with at least about 2 moles of the diallyl ether of an aliphatic triol. Preferably, about a 5% by weight excess of the latter is employed. These components and a reflux solvent such as xylene are preferably charged to a reactor equipped with stirrer heater and means for providing an atmosphere inert to the reactants and resulting product (unless the vapors of the reactants are employed for this purpose). The reaction mixture is heated to a temperature sufficient to esterify these reactants. Temperatures up to about 400° F. are preferably employed. Heating is preferably continued until an acid number of about 5 – 8 is obtained. This result is usually achieved over a period of 15–16 hours. As is well known, the reaction time, temperature and final acid number may be varied depending upon the reactants employed, speed desired of reaction, and desired purity of the ester monomer. The resulting monomer has a molecular weight of about 575 and a high degree of unsaturation.

The polyester, or the combined polyester and diester monomer, is preferably prepared as an emulsion such as shown in the Examples. In addition to the liquid vehicle constituents such as water and n-butanol, other constituents such as emulsifier, curing agents, and catalysts may be included in the emulsion. After the emulsion is applied as a film, it is cured at an appropriate temperature until the desired film hardness is obtained as is well known. The polyester or combined polyester and diester monomer may also be employed as solution coatings or even as 100% solids coatings. Preferably, the diester monomer is employed in amounts between about 5% and about 25% by weight of the total weight of polyester and diester monomer although both lower (including none) and higher amounts may be employed.

EXAMPLE 1

This Example illustrates the formulation of a diester monomer which may be cured in combination with the polyester resins described herein.

To a reactor which was fitted with a stirrer and heater, the following reactants were charged: trimethylol propane diallyl ether — 6,364 parts, adipic acid — 2,172 parts, and 85% phosphoric acid solution — 40 parts. A carbon dioxide atmosphere was produced in the reactor, and heat was commenced with the temperature being raised to about 400°F over a period of approximately three hours. This temperature was maintained for an additional three hours, at which time the heat was turned off. Next day heating was again commenced and the temperature was raised to 400°F in approximately an hour and held there for an additional 5 hours. The heat was then turned off, and the toluene which had been included in the reaction mixture as a reflux solvent was blown off by carbon dioxide gas. The acid number of the resulting solids was 7.8.

EXAMPLE 2

This Example illustrates the formulation and curing of a coating composition of this invention.

To a reaction vessel fitted with stirrer, heater and carbon dioxide gas connection, 1705.5 parts of 1,6-hexanediol (14.4 moles) and 2827.9 parts of maleic anhydride (28.8 moles) were charged. The reaction vessel was provided with a carbon dioxide atmosphere, and heat was commenced after toluene was added as a reflux solvent. Heating was continued until an exotherm started (about 25 minutes) at 175°F. The heat was turned off and the temperature continued to climb to about 275°F, at which time the heat was again turned on. Neopentyl glycol (3003.8 parts, 28.8 moles) and 85% phosphoric acid solution (94.5 parts) were added at this time to the reaction vessel. Heating was continued to raise the temperature to about 390°F (about 8 hours after heating was initially started). At this time the acid number on the solids in the reaction vessel was 5.5. The heat was shut off but was turned on the following day and 2,700 parts of monoallyl maleate and 1.8 parts of hydroquinone were added to the reaction vessel. Heating was continued to raise the temperature to 380°F over an additional nine hours, at which time heating was discontinued. Carbon dioxide gas was used to remove the toluene and all excess alcohol. The acid number on the resulting polyester solids was 16.9.

A 25% solids emulsion was made by first charging each of the following constituents to a reaction vessel fitted with heater and stirrer: 2,120 parts of the polyester resin made as described in this example, 600 parts of di(trimethylol propane diallyl ether) adipate, 80 parts of butyl cellosolve, 160 parts of n-butanol, 32 parts of nonenyl phenoxy polyoxy ethanol (emulsifier) and 80 parts of butylated melamine (curing agent). Heating of this mixture was commenced, and the temperature was raised quickly to 200°F (about 45 minutes) and held at that temperature for 20 minutes, at the end of which time the heat was turned off. At this time 2,000 parts of distilled water and 48 parts of dimethyl ethanol amine premix were added in fractions. After all of this premix except for 350 cc. was added, an inversion to an oil-in-water emulsion occurred. Thereafter, 4,960 parts of distilled water were added, and the resulting emulsion was stirred for 11 minutes.

The pH at 25°C of this emulsion was 7.5 and had a density of 8.48 pounds per gallon.

A 12.5% coating composition was made by mixing together 3,125 cc. of the aforementioned polyester resin with 2,450 cc. of distilled water; 182.5 cc. of an accelerator mixture comprising 30 cc. of cyclodex 6% cobalt naphthanate and (a $CO_2$ atmosphere was maintained over the reactants during this time) 700 cc. of DMEA; and 530 cc. of a catalyst mixture comprising 150 cc. of 2-ethyl hexanol, 850 cc. of butyl cellosolve and 70 cc. of cumene hydro peroxide.

The resulting coating composition was coated on a bare aluminum can with the excess material being allowed to run off, after which the coating was cured at 400°F for two minutes. The cure was very good with excellent flow out. Immersion in boiling water for one hour showed no effect on the cured coating, which also showed no attack by copper sulfate when subjected to the latter.

EXAMPLE 3

This example illustrates a formulation of several polyester resins according to this invention and the curing coating compositions made from those resins.

The procedure employed to produce each of the polyester resins was substantially the same as described in Ex. 2. The components and amounts thereof are set forth in Table 1. In each case a diol (1) was reacted with an anhydride (2) in a molar ratio of 1:2, respectively. After the resulting exotherm, additional diol (3) was reacted with the diester to produce the tetraester with an over-all molar ratio of 3:2 (diol to acid). In each instance, the phosphoric acid solution (4) was added together with the second portion of diol. Heating of the reactants to form the tetraester was continued until the acid number on the solids in the reaction vessel was as set forth in Table 2 at (1). Thereafter, monoallyl maleate (5) and hydroquinone were reacted with the tetraester in the amounts shown in Table 1. At the heat was turned off and 20 parts of butylated methylmelamine (243-3) were charged to the reactor with continued stirring. Thereafter, a premix comprising 250 parts of distilled water and 6 parts of dimethyl ethanolamine was slowly charged at a temperature of about 165°F. Inversion took place when 140 cc. of this premix had been charged. At a temperature of about 105°F, 620 parts of distilled water were charged.

Each of the resulting 25% solids emulsions was used to make a corresponding 10% clear emulsion as described in Ex. 4. The resulting compositions were coated onto bare aluminum and cured at 400°F for two minutes. Each coating exhibited good flow and withstood attack from an acidic (HCl) copper sulphate solution for 1 minute.

EXAMPLE 4

A 25% solids emulsion was made in the identical manner as the 25% solids emulsion of Ex. 2, except that in place of the polyester resin employed therein, a polyester resin derived from the following different constituents but using a substantially identical formulating procedure was employed: neopentyl glycol — 626.6 parts; maleic anhydride — 1178.3 parts; neopentyl glycol — 1251.6 parts; 85% phosphoric acid solution — 3.8 parts; mono allyl maleate — 1125 parts; and hydroquinone — 0.76 parts. This polyester resin had a solids acid number of 23.9.

The characteristics of the 25% solids emulsion were:

TABLE 1

| Constituent | Amount (parts by weight) | | | | | | |
|---|---|---|---|---|---|---|---|
| | A | B | C | F | G | J | M |
| (1) 1,4-dimethanol cyclohexane | 520.8 | | | | | | |
| (1) 2,2,4-trimethyl pentane-1,3 diol | | 438 | | | | | |
| (1) dipropylene glycol | | | 388.7 | | 436.1 | | |
| (1) 1,6 hexane diol | | | | | | 362 | |
| (1) diethylene glycol | | | | 383.3 | | | 383.3 |
| (2) maleic anhydride | 707 | 588 | 565.6 | 707 | 636.3 | 601 | 707 |
| (3) neopentyl glycol | 751 | 657 | | 751 | 675.9 | 638 | |
| (3) dipropylene glycol | | | 774.2 | | | | |
| (3) diethylene glycol | | | | | | | 765.6 |
| (4) di-n-butyl tin oxide | | 2.2 | | | | | |
| (4) H₃PO₄ (85% sol'n) | 25.2 | | 22.7 | 23.8 | 23.5 | 22 | 23.8 |
| (5) mono allyl maleate | 675 | 564 | 540 | 675 | 608.5 | 577 | 675 |
| (6) hydroquinone | 0.6 | 0.5 | 0.5 | 0.5 | 0.5 | 0.5 | 0.5 | completion of the latter reaction the acid number on the resulting polyester solids was as shown in Table 2 at (2).

TABLE 2

| | A | B | C | F | G | J | M |
|---|---|---|---|---|---|---|---|
| Acid No. 1 | 4.9 | 2.5 | 8.2 | 6.1 | 4.5 | 5.1 | 10.1 |
| Acid No. 2 | 18.9 | 19.7 | 20.1 | 20.9 | 19.6 | 18.7 | 20.5 |

A 25% solids emulsion was made from each of these polyester resins. In each case, the components, amounts and procedure were the same except for the polyester resin itself. Therefore, the formulation of only the 25% solids emulsion using polyester resin A will be described.

To an 85% solids solution of resin A (using butyl cellosolve as the solvent) in a reaction vessel, there were added: 75 parts of the diester monomer from Ex. 1; 10 parts of butyl cellosolve; 20 parts of butanol; and 4 parts of nonenyl phenoxy polyoxyethanol (N-101). This mixture was heated to a temperature of about 200°F over a period of about 40 minutes after which pH at 25°C — 7.5; color — pinkish; and wt./gal — 8.48 lb. From this emulsion, a 10% clear emulsion was made as follows.

At room temperature, 117 cc. of distilled water were added to 100 cc. of the aforedescribed 25% solids emulsion with vigorous stirring until these two components were thoroughly blended. Thereafter, 0.3 cc. of Cyclodex 6% cobalt naphthanate and 8 cc. of dimethylethanolamine were added in the form of a premix as an accelerator for the resin. After these reactants were mixed, the following were added to the resulting mix with further stirring: 0.5 cc. of cumene hydroperoxide; 4 cc. of 2-ethyl hexanol; and 21 cc. of butyl cellosolve. This addition, which was also made in the form of a premix, constituted the catalyst mixture for the resin.

The resulting 10% emulsion was coated on a metal panel with allowance for a two-minute drain-off of excess before it was cured at 400°F for two minutes. The cured coating was impervious to attack by acidic copper sulphate solution after one minute and exhibited a smooth finish with high gloss.

I claim:

1. A method of making a polyester prepared from an unsaturated dicarboxylic acid component and a diol, said method comprising the steps of:

admixing about 3 moles of a diol with 2 moles of an unsaturated aliphatic dicarboxylic acid to provide a reaction mixture;

heating said reaction mixture to a temperature sufficient to esterify the reactants in said reaction mixture to produce a tetraester having end hydroxyl groups;

adding a monoester of an unsaturated monohydric alcohol and an unsaturated dicarboxylic acid to said tetraester in an amount to provide about 1.2 moles of said monoester per mole of said tetraester; and heating the resulting mixture to esterify said tetraester and said monoester and continuing said heating until an acid number of less than about 28 is obtained on the solids in said mixture to produce said unsaturated polyester.

2. The method of claim 1 wherein said admixing step is carried out in two stages, the first stage comprising admixing about one mole of said diol with two moles of said dicarboxylic acid to produce a first reaction mixture and the second stage comprising adding an additional two moles of said diol to said first reaction mixture after said heating of said first reaction mixture has esterified the reactants in said first reaction mixture.

3. The method of claim 1 wherein said esterification reactions are carried out in an atmosphere inert to the reactants.

4. The method of claim 1 wherein said heating in the first heating step is continued until the solids in said reaction mixture have an acid number at least as low as about 5 before said monoester is added thereto.

5. The method of claim 1 wherein said reaction mixture includes a catalyst to increase the rate of esterification of said diol with said dicarboxylic acid.

6. The method of claim 1 wherein said reaction mixture includes a reflux solvent.

7. The method of claim 1 wherein said monoester is selected from the group consisting of: monoallyl maleate; monovinyl maleate; mono methallyl maleate; monoallyl fumarate; mono methallyl fumarate; mono methallyl itaconate; monoallyl itaconate; mono allyl tetra hydrophthalate; and mono methallyl tetra hydrophthalate.

8. The method of claim 7 wherein said dicarboxylic acid is selected from the group consisting of maleic acid, tetrahydrophthalic acid, octenyl and nonenyl succinic acids, fumaric acid, and anhydrides thereof.

9. The method of claim 8 wherein said diol is an aliphatic, straight chain diol.

10. The method of claim 1 which further includes the step of heating said unsaturated polyester in the presence of a free-radical forming catalyst to crosslink said polyester.

11. The method of claim 1 which further includes the steps of:

admixing said unsaturated polyester with the diester monomer product made by esterifying 1 mole of a saturated aliphatic dicarboxylic acid having from 4–10 carbons with at least about 2 moles of a diallyl ether of an aliphatic triol; and heating said polyester and said diester monomer product in the presence of a free-radical forming catalyst to cross-link said polyester and said diester monomer product.

12. The method of claim 11 wherein said saturated dicarboxylic acid is selected from the group consisting of adipic acid, succinic acid, azelaic acid, trimethyl adipic acid, glutaric acid, suberic acid and sebacic acid.

13. The method of claim 11 wherein said diallyl ether of an aliphatic triol is selected from the group consisting of the diallyl and dimethallyl ethers of trimethylol propane, trimethylol butane and trimethylol ethane.

14. The method of claim 11 wherein said diester monomer product has an acid number of about 5–8.

15. The method of claim 11 wherein the weight of said diester monomer product is between about 5% and about 25% by weight of the total weight of said diester monomer and said unsaturated polyester.

16. A method of making a polyester prepared from an unsaturated dicarboxylic acid component and a diol, said method comprising the steps of:

admixing about 3 moles of an aliphatic straight chain diol with 2 moles of an unsaturated aliphatic dicarboxylic acid together with a reflux solvent to provide a reaction mixture;

heating said reaction mixture to a temperature sufficient to esterify the reactants in said reaction mixture to produce a tetraester having end hydroxyl groups, said heating continuing until the solids in said reaction mixture have an acid number at least as low as about 5;

adding a monoester member of the group consisting of: monoallyl maleate, monovinyl maleate, mono methallyl maleate, monoallyl fumarate, mono methallyl fumarate, mono methallyl itaconate, monoallyl itaconate, monoallyl tetra hydrophthalate, and mono methallyl tetra hydrophthalate, to said tetraester in an amount to provide about 1.2 moles of said monoester per mole of said tetraester; and heating the resulting mixture to esterify said tetraester and said monoester and continuing said heating until an acid number of less than about 28 is obtained on the solids in said mixture to produce said unsaturated polyester.

17. The method of claim 16 which further includes the step of heating said unsaturated polyester in the presence of a free-radical forming catalyst to crosslink said polyester resin.

18. The method of claim 16 which further includes the steps of:

admixing said unsaturated polyester with the diester monomer product made by esterifying 1 mole of a dicarboxylic acid selected from the group consisting of adipic acid, succinic acid, azelaic acid, trimethyl adipic acid, glutaric acid, suberic acid and sebacic acid, with about 2 moles of a member of the group consisting of the diallyl and dimethallyl ethers of trimethylol propane, trimethylol butane and trimethylol ethane; and heating said polyester and said diester monomer product in the presence of a free-radical forming catalyst to cross-link said polyester and said diester monomer product.

19. The method of claim 18 wherein said diester monomer product has an acid number of about 5–8.
20. The polyester of claim 1.
21. The cured product of claim 10.
22. The cured product of claim 11.
23. The method of claim 1 wherein said unsaturated aliphatic dicarboxylic acid is a mono-unsaturated aliphatic substituted, saturated dicarboxylic acid.
24. The method of claim 16 wherein said unsaturated aliphatic dicarboxylic acid is a mono-unsaturated aliphatic substituted, saturated dicarboxylic acid.

* * * * *